UNITED STATES PATENT OFFICE.

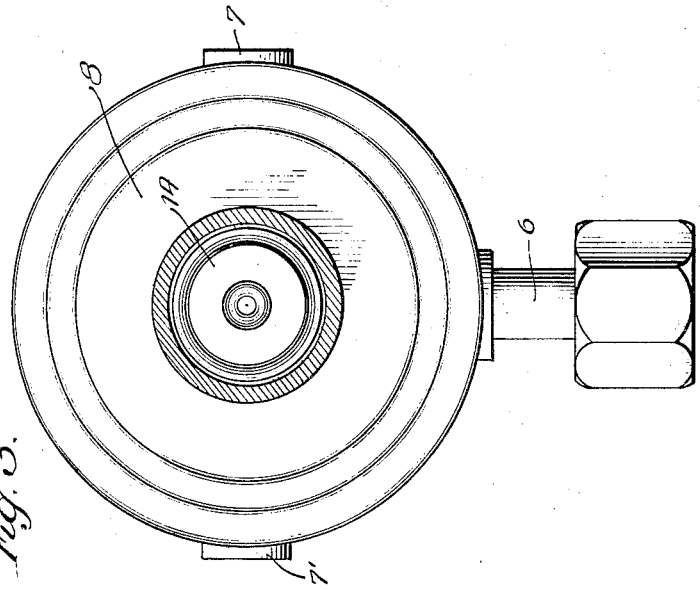

CHARLES L. BASTIAN, OF CHICAGO, ILLINOIS.

FLUID-PRESSURE-REGULATING VALVE.

1,408,926.  Specification of Letters Patent.  Patented Mar. 7, 1922.

Application filed May 24, 1920. Serial No. 383,646.

*To all whom it may concern:*

Be it known that I, CHARLES L. BASTIAN, a citizen of the United States, residing at Chicago, in the county of Cook and State of Illinois, have invented certain new and useful Improvements in Fluid-Pressure-Regulating Valves, of which the following is a specification.

This invention relates to improvements in fluid pressure regulating valves which are used for many purposes, including the regulation and delivery of gases to oxy-acetylene welding and cutting apparatus at desired pressures.

The object of this invention is to provide a simple means for automatically maintaining the delivery of a predetermined volume of gas regardless of the fact that the pressure supply is constantly decreasing; and more specifically my object is to provide piston means operating as the pressure supply decreases to automatically enlarge the opening between the nozzle and the disk in proportion to the decrease of pressure supply to maintain constantly an even delivery of gas in a uniform volume.

In the drawings I have illustrated a selected embodiment of the invention and referring thereto, Fig. 1 is a vertical section through a pressure regulating valve embodying the invention.

Fig. 2 is a plan view partly in section on the line 2—2 of Fig. 1.

Fig. 3 is a detail enlarged sectional view.

Referring to the drawings, the valve casing comprises a body 5 provided with a gas inlet 6 and an outlet 7 through which the gas may be delivered to the work. A pressure gauge is generally connected to another opening 7' in the body. A bonnet 8 is threadedly engaged with the body 5 and is preferably provided with openings 9 to permit instant escape of pressure without blowing off the bonnet in the event that the diaphragm is broken. The diaphragm 10 is secured to a yoke 11 and a collar 12 which threadedly engages the yoke. A pair of springs 13, 13' of relatively different strength are disposed one within the other within the bonnet and engaging the collar 12. A button 14 forms a bearing for the adjusting screw which operates through the bonnet. An inlet nozzle 16 is threadedly secured in the bridge 17 forming part of the body, and this nozzle co-operates with a disk 18 which is carried by a support 19 secured to the yoke 11. The valve, nozzle and disk are preferably constructed in accordance with my invention as set forth in my pending application Serial No. 272,421 filed January 22, 1919, and as thus far described the invention is more fully set forth in my application Serial No. 383,647 filed concurrently herewith, but I reserve the right to embody the invention in any other valves for which it may be applicable.

It is customary to turn the screw 15 to adjust the tension of the springs 13 and 13' to permit the desired pressure, as shown by the gauge, to be delivered to the work. The tension of the regulating springs overcomes the tension of the balance spring 30, which is interposed between the back cap 29 and the support 19, and operates the diaphragm to carry the disk 18 away from the nozzle sufficiently to admit pressure to the chamber 31 in the body at the predetermined pressure to be delivered. Since the screw adjustment is made with relation to the initial pressure supply, it is apparent that as the pressure supply decreases the screw must be readjusted if the disk and the nozzle are to be preserved in proper operative relation to maintain the desired uniformity in delivery pressure. It has been customary in the past to manually adjust the screw from time to time while the valve is in use in an effort to proportion the tension of the springs to the pressure supply as the supply decreases. My invention takes care of this automatically by utilizing the pressure supply through a piston operating in the gas inlet to regulate the spring tension after the initial setting so that the spring tension is automatically adjusted in proportion to the variation in pressure supply as such pressure decreases. In the embodiment of my invention illustrated in the drawings, a piston 39 on a piston rod 40 operates in a chamber 41 in the bridge 17 between the end of the inlet passage 6 and the nozzle 16. The piston rod projects through a packing 42 and a gland 43 to engage the yoke 11. The supply pressure operating against the piston holds the piston rod in engagement with the yoke and as the pressure supply decreases and the pressure reduces the piston will correspondingly yield and the pressure of the springs will increase the separation of the valve disk from the nozzle so that the volume of gas admitted to the chamber 31 for delivery to the work and the desired pressure may be maintained constant regardless of the decreasing pressure supply.

With this invention, the same volume of gas is constantly delivered, at the desired pressure, regardless of variation in the pressure supply and without necessitating any readjustment of the regulating screw. The size of the opening between the disk and the nozzle is proportioned to the pressure supply automatically through the action of the piston under the influence of the pressure supply and the springs.

It is my present opinion that the construction as herein illustrated and described is well adapted to secure the results sought for, but I reserve the right to make all such changes therein as fairly fall within the scope of the following claims.

I claim:

1. In a pressure regulating valve, the combination of a casing providing a chamber having an inlet and an outlet, pressure sensitive means for controlling the inlet to said chamber, and piston means for automatically controlling said pressure sensitive means to maintain a constant inlet volume as the pressure supply decreases.

2. In a pressure regulating valve, the combination of a casing providing a chamber having an inlet and an outlet, pressure sensitive means for controlling the inlet to said chamber, and a piston operating in communication with said inlet to automatically control said pressure sensitive means to maintain a constant inlet volume as the pressure supply decreases.

3. In a pressure regulating valve, the combination of a casing providing a chamber having an inlet and an outlet, pressure sensitive means for controlling the inlet to said chamber, and a piston in communication with said inlet and adapted to be operated by the pressure supply for automatically controlling said pressure sensitive means to maintain a constant inlet volume as the pressure supply decreases.

4. In a pressure regulating valve, the combination of a casing providing a chamber having an inlet and an outlet, a nozzle at the discharge end of said inlet, a valve disk adapted to be seated against said nozzle, a diaphragm, a yoke connecting the disk and the diaphragm, a spring operating on said diaphragm, a chamber communicating with said inlet, a piston operating in said chamber, and a piston rod operated by the piston and engaging said yoke.

5. In a pressure regulating valve, the combination of a casing providing a chamber having an outlet, a bridge having an inlet, a nozzle on the bridge at the end of said inlet, a valve disk adapted to be seated against said nozzle, a diaphragm, a yoke connecting the disk and the diaphragm, a spring operating against the diaphragm, a chamber in the bridge adjacent the nozzle, a piston operating in said chamber, and a piston rod connected to the piston and operatively engaging the yoke.

CHARLES L. BASTIAN.